(12) United States Patent
Miyake et al.

(10) Patent No.: US 7,964,057 B2
(45) Date of Patent: Jun. 21, 2011

(54) COLD SEAL ADHESIVE

(75) Inventors: Kevin Kei Miyake, Tower Lakes, IL (US); Katherine Sue Rice, Glenside, PA (US)

(73) Assignee: Rohm and Haas Company, Philadelphia, PA (US)

( * ) Notice: Subject to any disclaimer, the term of this patent is extended or adjusted under 35 U.S.C. 154(b) by 626 days.

(21) Appl. No.: 11/648,426

(22) Filed: Dec. 29, 2006

(65) Prior Publication Data

US 2007/0158023 A1 Jul. 12, 2007

Related U.S. Application Data

(60) Provisional application No. 60/757,762, filed on Jan. 10, 2006, provisional application No. 60/851,132, filed on Oct. 12, 2006.

(51) Int. Cl.
| | |
|---|---|
| *C04B 37/00* | (2006.01) |
| *B32B 27/08* | (2006.01) |
| *C08F 283/00* | (2006.01) |
| *C08G 6/02* | (2006.01) |
| *C08L 61/02* | (2006.01) |

(52) U.S. Cl. .................. 156/325; 428/516; 525/521

(58) Field of Classification Search .................. 156/325; 428/516; 525/521

See application file for complete search history.

(56) References Cited

U.S. PATENT DOCUMENTS

| | | | | |
|---|---|---|---|---|
| 4,888,395 A | * | 12/1989 | Min | 525/301 |
| 4,889,884 A | | 12/1989 | Dust et al. | |
| 4,902,370 A | * | 2/1990 | Dust et al. | 156/327 |
| 5,070,164 A | * | 12/1991 | Min et al. | 526/286 |
| 5,292,842 A | * | 3/1994 | Yang | 526/318.4 |
| 5,486,426 A | * | 1/1996 | McGee et al. | 428/516 |
| 5,567,773 A | * | 10/1996 | McGee et al. | 525/221 |
| 6,060,532 A | | 5/2000 | Frankel et al. | |
| 6,258,887 B1 | * | 7/2001 | Bardman et al. | 524/521 |
| 6,613,831 B1 | | 9/2003 | Bentley et al. | |
| 6,809,141 B2 | * | 10/2004 | Fasano et al. | 524/457 |
| 2003/0127181 A1 | * | 7/2003 | Kreckel et al. | 156/247 |

FOREIGN PATENT DOCUMENTS

| | | |
|---|---|---|
| EP | 1008635 A1 | 6/2000 |
| JP | 1996118560 | 5/1996 |
| JP | 1999335632 | 12/1999 |
| JP | 2002256244 | 9/2002 |
| JP | 2003105298 | 4/2003 |
| WO | WO 98/33831 | 8/1998 |

* cited by examiner

*Primary Examiner* — Philip C Tucker
*Assistant Examiner* — Michael N Orlando
(74) *Attorney, Agent, or Firm* — Kenneth Crimaldi

(57) ABSTRACT

A cold seal adhesive comprising a multi-stage polymer having a low-$T_g$ first stage and a high-$T_g$ second stage.

7 Claims, No Drawings

COLD SEAL ADHESIVE

This is a non-provisional application of prior pending U.S. provisional Application Ser. No. 60/757,762 filed on Jan. 10, 2006 and U.S. provisional Application Ser. No. 60/851,132 filed on Oct. 12, 2006.

This invention relates to a cold seal adhesive comprising a multi-stage synthetic polymer.

Multi-staged emulsion polymer binders have been described in the art. For example, U.S. Pat. No. 6,060,532 discloses a multi-staged polymer binder useful in coatings, caulks and sealants. However, this reference does not disclose a method for forming a cold seal on a polymer film.

The problem addressed by the present invention is the need for improved cold seal adhesives.

STATEMENT OF INVENTION

The present invention provides a method for forming a cold seal on a polymer film. The method comprises: (a) applying to the polymer film a layer of a polymer latex comprising a polymer having a first phase and a second phase, where the first phase has a $T_g$ from −60° C. to −20° C., from 0.5% to 8% carboxylic acid monomer residues, and at least 50% of residues derived from $C_4$-$C_{22}$ alkyl acrylates; and the second phase has a $T_g$ of at least 30° C. and at least 0.5% less carboxylic acid monomer residue than the first phase; wherein the first phase is from 60% to 95% of the polymer; and (b) forming a seal by contacting two polymer film surfaces comprising a layer of polymer latex to form a seal without heating.

The present invention is further directed to a polymer having a first phase and a second phase, where the first phase has a $T_g$ from −55° C. to −30° C., from 0.5% to 5% carboxylic acid monomer residues, and at least 50% of residues derived from $C_4$-$C_{22}$ alkyl acrylates; and the second phase has a $T_g$ of at least 80° C. and at least 0.5% less carboxylic acid monomer residue than the first phase; wherein the first phase is from 60% to 95% of the polymer, and the polymer is substantially free of monomer residues having more than one carboxyl group.

DETAILED DESCRIPTION

Percentages are weight percentages and temperatures are in ° C., unless specified otherwise.

As used herein the term "(meth)acrylic" refers to acrylic or methacrylic, and "(meth)acrylate" refers to acrylate or methacrylate. "Acrylic monomers" include acrylic acid (AA), methacrylic acid (MAA), esters of AA and MAA, acrylamide (AM), methacrylamide (MAM), acrylonitrile (AN) and derivatives of AM and MAM. Esters of AA and MAA include, but are not limited to, alkyl and hydroxyalkyl esters, e.g., methyl methacrylate (MMA), ethyl methacrylate (EMA), butyl methacrylate (BMA), isobutyl methacrylate (IBMA), hydroxyethyl methacrylate (HEMA), hydroxyethyl acrylate (HEA), isobornyl methacrylate (IBOMA), methyl acrylate (MA), ethyl acrylate (EA), butyl acrylate (BA), and longer chain alkyl (meth)acrylates such as ethylhexyl acrylate (EHA), lauryl acrylate (LA), lauryl methacrylate (LMA), cetyl methacrylate (CEMA), and stearyl methacrylate (SMA). The term "(meth)acrylamide" refers to acrylamide (AM) or methacrylamide (MAM). Derivatives of (meth)acrylamide include, but are not limited to, alkyl- and hydroxyalkyl-substituted (meth)acrylamides, e.g., N,N-dimethyl acrylamide. A "carboxylic acid monomer" is an ethylenically unsaturated monomer having at least one carboxyl group. Examples of carboxylic acid monomers include, e.g., AA, MAA, crotonic acid, maleic acid, succinic acid and fumaric acid.

The term "acrylic polymers" refers to polymers of acrylic monomers, and copolymers comprising at least 50% of acrylic monomers and (meth)acrylamide monomers. Preferably, acrylic polymers have at least 80% of monomer residues derived from (meth)acrylic acid or (meth)acrylate or (meth)acrylamide monomers, more preferably at least 90%, and most preferably at least 95%. The remaining monomer units are derived from other ethylenically unsaturated monomers. Preferably, the remaining monomer units are derived from styrene monomers, e.g., styrene (Sty) or a-methylstyrene. Preferably, acrylic polymers are substantially free of residues of aliphatic olefin monomers. Preferably, acrylic polymers are substantially free of residues of monomers other than acrylic monomers and styrene.

An "alkyl" group is a substituted or unsubstituted hydrocarbyl group having from one to twenty-two carbon atoms in a linear, branched or cyclic arrangement. Alkyl groups optionally have one or more double or triple bonds. Substitution on alkyl groups of one or more halo, trialkylsilyl, hydroxy, alkoxy, nitrogen-containing (e.g., amino substituted by up to two alkyl groups), phosphorus-containing (e.g., phosphonate, phosphite or phosphate) groups is permitted; alkoxy or trialkylsilyl groups may in turn be substituted by one or more halo substituents. Preferably, alkyl groups have no alkoxy or halo substituents other than fluoro substituents, and most preferably, alkyl groups are saturated and unsubstituted. Preferably, alkyl groups are straight or branched chain aliphatic alkyl groups. It is understood that the alkyl groups may be either of synthetic or of natural origin and, in the latter case particularly, may contain a range of chain lengths. For example, naturally sourced stearic acid, even of commercially pure quality may contain only about 90% of stearic chains, up to about 7% of palmitic chains and a proportion of other chains and lower quality products may contain substantially less stearic acid. It is intended herein that reference to the chain length of such groups is to the predominant chain length which is present as more than 50%, preferably in more than 75%, of the chains.

The polymer film used in the present invention preferably comprises a polyolefin (e.g., polyethylene or polypropylene) or polyester base film with a thickness from 20 µm to 50 µm. Typically, to one side of the base film is bonded a release film having a thickness from 20 µm to 50 µm, or a release coating having a thickness from 1.30 µm to 1.95 µm; the adhesive is applied to the other side of the base film. The release film or release coating allows the film with a layer of adhesive to be wound into a roll, with the adhesive contacting the release film or coating. Typical techniques well known in the art are used to apply the polymer latex to the film. The preferred amount of polymer latex applied, measured after drying, is from 1 g/m$^2$ to 7.5 g/m$^2$, alternatively from 2 g/m$^2$ to 6.5 g/m$^2$, alternatively from 3.5 g/m$^2$ to 5.5 g/m$^2$. Typically, a pressure from 40-100 psi (276-690 kPa) is used to form the seal between layers of polymer latex, preferably from 60-80 psi (414-552 kPa). The seal can be formed by mating an adhesive layer from one area of a film surface with an adhesive layer from another area of the same film surface by folding the film, or by mating adhesive areas from two different films. Preferably, the seal is formed at a temperature from 0° C. to 40° C. Typical uses for the cold seal adhesive are packaging of confectionary items which may be damaged by heat sealing techniques, including chocolate confections and ice cream products.

The multi-phase polymer of the present invention is produced by a multi-stage emulsion polymerization process, in which the monomer composition changes as the polymer is prepared. In the preparation, a first stage monomer composition is polymerized, followed by a second stage monomer composition. The first phase of the polymer, as the phrase is used herein, refers to a polymer formed by the first stage monomers. The $T_g$ of the first phase is defined herein as the $T_g$ of the polymer that would be produced by polymerization of the first stage monomers alone, and the $T_g$ of the second phase is defined as the $T_g$ of the polymer that would be produced by polymerization of the second stage monomers alone. Similarly, the compositions and amounts of the first and second phases are defined as the compositions and amounts of the first and second stage monomer mixtures, respectively. Typically, the first stage of the polymerization is performed, followed by a residual monomer reduction step to consume any unreacted monomers. The second stage monomer composition is then added, and polymerization is allowed to continue, followed by a final residual monomer reduction step. Typically, the average particle size of the polymer latex is from 200 nm to 600 nm, alternatively from 300 nm to 400 nm. Typically, the polymer latex is from 40-65% solids, alternatively from 45-60%, alternatively from 48-57%.

In one embodiment of the invention, the first phase is at least 65% of the total polymer weight, alternatively at least 70%, alternatively at least 75%, alternatively at least 80%. In one embodiment of the invention, the first phase is no more than 95% of the total polymer weight, alternatively no more than 90%.

In one embodiment of the invention, the first phase of the polymer has at least 65% of the $T_g$ of at least $-55°$ C., alternatively at least $-50°$ C., alternatively at least $-45°$ C. In one embodiment of the invention, the first phase of the polymer has a $T_g$ no greater than $-25°$ C., alternatively no greater than $-30°$ C. In one embodiment of the invention, the second phase of the polymer has a $T_g$ no greater than $200°$ C., alternatively no greater than $150°$ C. In one embodiment of the invention, the second phase of the polymer has a $T_g$ of at least $50°$ C., alternatively at least $65°$ C., alternatively at least $80°$ C. $T_g$ is calculated using the Fox equation (T. G. Fox, Bull. Am. Physics Soc., vol. 1(3), page 123 (1956)).

In one embodiment of the invention, the first phase of the polymer has at least 80% acrylic monomer residues, alternatively at least 85%, alternatively at least 90%, alternatively at least 95%, alternatively at least 97%.

In one embodiment of the invention, the polymer has no more than 8% carboxylic acid monomer residues, alternatively no more than 7%, alternatively no more than 6%, alternatively no more than 5%, alternatively no more than 4.5%. In one embodiment of the invention, the first phase of the polymer has at least 1% carboxylic acid monomer residues, alternatively at least 1.5%, alternatively at least 2%, alternatively at least 3%, alternatively at least 3.5%. In one embodiment of the invention, the first phase of the polymer has no more than 7% carboxylic acid monomer residues, alternatively no more than 6%, alternatively no more than 5%, alternatively no more than 4.5%. In one embodiment of the invention, the first phase has residues of 0.2-0.5% acrylamide, an acrylamide derivative or a hydroxyalkyl acrylate and 0.5-3% carboxylic acid monomer residues, alternatively 0.5-2% carboxylic acid monomer residues. In one embodiment of the invention, the second phase of the polymer has at least 1% less carboxylic acid monomer residue than the first phase, alternatively at least 1.5% less, alternatively at least 2% less, alternatively at least 2.5% less, alternatively at least 3% less. In one embodiment of the invention, the second phase of the polymer has no more than 2% carboxylic acid monomer residues, alternatively no more than 1%, alternatively no more than 0.5%, alternatively no more than 0.2%, alternatively no more than 0.1%. In one embodiment of the invention, the polymer is substantially free of monomer residues having more than one carboxyl group, i.e., it has less than 0.1% of such residues, alternatively less than 0.05%. In one embodiment of the invention, the polymer contains no monomer residues having more than one carboxyl group. Especially preferred carboxylic acid monomer residues are those having only one carboxyl group, including AA and MAA. In one embodiment of the invention, the first phase of the polymer has no more than 4% AA monomer residues, alternatively no more than 3%, alternatively no more than 2%. In one embodiment of the invention, the pH of the polymer latex is adjusted to 7-10 prior to use.

In one embodiment of the invention, the first phase of the polymer has less than 5% monomer residues from crosslinkers, alternatively less than 2.5%, alternatively less than 1%, alternatively less than 0.5%, alternatively less than 0.2%, alternatively less than 0.1%. In one embodiment of the invention, the polymer contains no monomer residues from crosslinkers. In one embodiment of the invention, the second phase of the polymer has less than 50% monomer residues from crosslinkers, alternatively less than 25%, alternatively less than 10%, alternatively less than 5%, alternatively less than 1%. In one embodiment of the invention, the polymer contains at least 0.5% monomer residues from crosslinkers.

In one embodiment of the invention, the first phase of the polymer has at least 65% of residues derived from $C_4$-$C_{22}$ alkyl acrylates, alternatively at least 80%, alternatively at least 85%, alternatively at least 90%. In one embodiment of the invention, the first phase of the polymer has at least 65% of residues derived from $C_4$-$C_8$ alkyl acrylates, alternatively at least 80%, alternatively at least 85%, alternatively at least 90%. In one embodiment of the invention, the second phase of the polymer has at least 75% of residues derived from styrene, $C_1$-$C_4$ alkyl methacrylates (e.g., MMA, EMA, BMA, IBMA) or combinations thereof, alternatively at least 90%, alternatively at least 95%. In one embodiment of the invention, the second phase of the polymer has at least 75% of residues derived from styrene, alternatively at least 90%, alternatively at least 95%. The polymer latex may include synthetic polyisoprene, natural rubber latex, butadiene rubber, or a combination thereof. Preferably, the polymer latex is free of natural rubber latex.

In one embodiment of the invention, the acrylic polymer has $M_w$ at least 200,000; typically the acrylic polymer has $M_w$ no more than 3,000,000. $M_w$ is measured by GPC calibrated with polystyrene standards.

Without being bound to the exact structure of the polymer of this invention, it is believed that the second phase of the polymer is discontinuous, and consists of separate second phase domains partially embedded in the first phase, i.e., the second phase is not a true "shell" as that term is used in relation to core-shell polymers.

EXAMPLES

Example 1

Preparation of Two-Stage Polymer

In a typical emulsion polymerization, a two-stage polymer with the following first stage//second stage composition: 93BA/2AN/1Sty/1.5AA2.5MAA//100 Sty, with 85% first stage and 15% second stage, was prepared by co-feeding the first stage monomers and sodium persulfate initiator for 150 minutes at 86° C., with a 10 minute overfeed of initiator. $FeSO_4$ was added to the emulsion, followed by a co-feed of tert-butyl hydroperoxide and sodium sulfoxylateformaldehyde for 20 minutes. The second stage monomer was then co-fed into the emulsion with tert-butyl hydroperoxide and isoascorbic acid, with 62 minutes overfeed of tert-butyl hydroperoxide and isoascorbic acid. The emulsion was cooled and pH was adjusted to 8.5-9.

Example 2

Preparation Application and Testing of Cold Seal Adhesive

The base latex was blended with wetting agents and defoamers to aid in machinability on commercial converting equipment. The defoamers and wetting agents (such as non-ionic surfactants) were used at levels about 0.04% to 1.5% (solid/solid).

Bonds of the adhesive are evaluated by applying on 400HM film from Exxon-Mobil, a suitable polypropylene film used in food confectionary packaging. The adhesive is applied in a coating weight range of 2.93 g/m$^2$ to 5.04 g/m$^2$ (actual=4.72 g/m$^2$) with a wire wound rod. Adhesive on film is dried in an oven at 120° C. for 30 seconds. One-inch wide strips were cut from the adhesive-film sample, mated face to face and crimped using a sealing device for a dwell time of 0.5 seconds and 60 psi (414 kPa) pressure. The sealing jaws were serrated, with 20 teeth per inch (20 teeth/2.54 cm).

The bond strengths were measured using a Thwing Albert tensile testing device or equivalent at the pull rate of 12 inches per minute (30.5 cm/minute). 300 g/linear inch (2.94 N/25 mm) (GLI) is the preferred minimum bond force.

To examine the release properties and longer term bond stability, one inch wide adhesive samples were covered with a release film having a thickness of 19 μm (CSR-2 from Exxon Mobil) and compressed in high pressure blocking jigs at 100 psi (690 kPa) in several different environments. These were: room temperature, 25° C., elevated temperature, 49° C., high humidity of 95% RH at 38° C., and freezing temperature of 0° C. or lower. After one week conditioning, the release was measured with a Thwing Albert tensile testing device or equivalent at the rate of 12 inches per minute (30.5 cm/minute). Average release force under 100 GLI (0.98 N/25 mm) is preferred.

Example 3

Polymer latices were prepared with the following first stage//second stage composition: 93BA/2AN/1Sty/1.5AA/2.5MAA//100 Sty, with the first stage and second stage percentages indicated in Table 1. The polymer latex was coated on film and tested as described in Example 2, with test results shown in Table 1 for the indicated conditioning of the sample.

Example 4

Polymer latices were prepared with the first stage composition described in Example 3, and with the second stage consisting only of the monomer listed in the first column of Table 2, with 85% first stage and 15% second stage. The polymer latices were coated on films and tested as described in Example 2, with results as shown in Table 2.

TABLE 2

| 2$^{nd}$ stage | conditioning, 100 psi (690 kPa) | average release, N/25 mm | peak release, N/25 mm | average bond, N/25 mm | peak bond, N/25 mm |
|---|---|---|---|---|---|
| Sty | 25° C.[1] | 0.27 | 0.50 | 4.85 | 5.28 |
|  | 49° C. | 0.34 | 0.53 | 4.51 | 4.81 |
|  | 95% RH, 37.8° C. | 0.92 | 1.28 | 4.53 | 4.92 |
| MMA | 25° C.[1] | 0.35 | 0.59 | 3.92 | 4.37 |
|  | 49° C. | 0.31 | 0.48 | 3.93 | 4.32 |
|  | 95% RH, 37.8° C. | 0.94 | 1.41 | 3.53 | 4.00 |
| BMA | 25° C.[1] | 0.52 | 0.85 | 3.01 | 3.23 |
|  | 49° C. | 0.68 | 0.97 | 2.93 | 3.12 |
|  | 95% RH, 37.8° C. | 1.73 | 2.76 | 2.37 | 2.77 |
| IBMA | 25° C.[1] | 0.50 | 0.79 | 3.09 | 3.35 |
|  | 49° C. | 0.67 | 0.83 | 3.18 | 3.46 |
|  | 95% RH, 37.8° C. | 1.17 | 1.99 | 3.02 | 3.52 |
| MMA/BGDMA[2] | 25° C.[1] | 0.29 | 0.51 | 3.20 | 3.74 |
|  | 49° C. | 0.27 | 0.42 | 3.12 | 3.60 |
|  | 95% RH, 37.8° C. | 0.76 | 1.00 | 3.07 | 3.50 |

[1]All entries marked 25° C. were performed at room temperature
[2]Butylene glycol dimethacrylate; MMA:BGDMA, 2:1 by weight

The invention claimed is:

1. A method for forming a cold seal on a polymer film; said method comprising:

(a) applying to the polymer film a layer of a polymer latex comprising a polymer having a first phase and a second phase, where the first phase has a $T_g$ from −55° C. to −30° C., from 1% to 5% carboxylic acid monomer residues, and at least 65% of residues of $C_4$-$C_8$ alkyl acrylates; and the second phase has a $T_g$ of at least 80° C., at least 90% of residues of styrene and at least 1% less carboxylic acid monomer residue than the first phase; wherein the first phase is from 80% to 95% of the polymer, and the polymer is substantially free of monomer residues having more than one carboxyl group; and

TABLE 1

| 1$^{st}$ stage, % | 2$^{nd}$ stage, % | conditioning, 100 psi (690 kPa) | average release, N/25 mm | peak release, N/25 mm | average bond, N/25 mm | peak bond, N/25 mm |
|---|---|---|---|---|---|---|
| 100 | 0 | 25° C.[1] | 0.47 | 1.06 | 3.70 | 3.95 |
|  |  | 49° C. | 0.63 | 1.31 | 3.29 | 3.49 |
|  |  | 95% RH, 37.8° C. | 1.16 | 1.67 | 3.01 | 3.19 |
| 95 | 5 | 25° C.[1] | 0.56 | 1.17 | 5.27 | 5.70 |
|  |  | 49° C. | 0.82 | 1.23 | 5.13 | 5.55 |
|  |  | 95% RH, 37.8° C. | 1.88 | 2.62 | 4.99 | 5.40 |
| 90 | 10 | 25° C.[1] | 0.39 | 0.72 | 5.00 | 5.34 |
|  |  | 49° C. | 0.58 | 0.83 | 5.14 | 5.53 |
|  |  | 95% RH, 37.8° C. | 1.23 | 1.95 | 4.70 | 5.34 |
| 85 | 15 | 25° C.[1] | 0.27 | 0.50 | 4.85 | 5.28 |
|  |  | 49° C. | 0.34 | 0.53 | 4.51 | 4.81 |
|  |  | 95% RH, 37.8° C. | 0.92 | 1.28 | 4.53 | 4.92 |
| 80 | 20 | 25° C.[1] | 0.17 | 0.35 | 4.14 | 4.44 |
|  |  | 49° C. | 0.24 | 0.39 | 3.93 | 4.33 |
|  |  | 95% RH, 37.8° C. | 0.64 | 0.86 | 4.22 | 4.52 |

[1]All entries marked 25° C. were performed at room temperature (b) forming a seal by contacting two polymer film surfaces comprising a layer of polymer latex to form a seal without heating.

2. The method of claim 1 in which the first phase has at least 80% of residues of $C_4$-$C_8$ alkyl acrylates.

3. The method of claim 2 in which the second phase has at least 95% of residues of styrene.

4. The method of claim 2 in which the first phase has from 3% to 5% carboxylic acid monomer residues.

5. The method of claim 4 in which the second phase has no more than 1% carboxylic acid monomer residues, and in which the second phase has at least 1.5% less carboxylic acid monomer residue than the first phase.

6. The method of claim 5 in which the first phase has at least 85% of residues of $C_4$-$C_8$ alkyl acrylates.

7. The method of claim 6 in which the first phase is from 80% to 90% of the polymer.

* * * * *